United States Patent

Jessop et al.

[11] Patent Number: 4,592,068
[45] Date of Patent: May 27, 1986

[54] REPEATER FOR A DIGITAL TRANSMISSION SYSTEM

[75] Inventors: Anthony Jessop, Harlow; Richard J. Catchpole, Bishop's Stortford; Peter J. Dyke, Stansted; Brian S. Farley, Bishop's Stortford, all of England

[73] Assignee: International Standard Electric Corporation, New York, N.Y.

[21] Appl. No.: 479,765

[22] Filed: Mar. 28, 1983

Related U.S. Application Data

[63] Continuation-in-part of Ser. No. 219,556, Dec. 23, 1980, abandoned.

[51] Int. Cl.[4] .............................................. H04B 3/36
[52] U.S. Cl. ........................................ 375/3; 375/11; 179/16 E
[58] Field of Search ............................... 375/3, 11–16; 328/164, 175; 333/18, 28 R; 370/97; 179/16 E, 16 F

[56] References Cited

U.S. PATENT DOCUMENTS

| | | | |
|---|---|---|---|
| 3,568,100 | 3/1971 | Tarbos | 333/28 |
| 3,578,914 | 5/1971 | Simonelli | 179/16 F |
| 3,697,875 | 10/1972 | Guanella | 375/12 |
| 3,728,649 | 4/1973 | Waldhauer | 333/28 R |
| 3,812,436 | 5/1974 | Fudemoto et al. | 333/28 R |
| 3,868,576 | 2/1975 | Bagidasarjanz et al. | 333/28 R |
| 3,962,549 | 6/1976 | Zuk | 179/16 EA |
| 4,001,525 | 1/1977 | Edwards | 179/175.31 R |
| 4,028,644 | 6/1977 | Niiro | 333/28 R |
| 4,112,368 | 9/1978 | Ewanus et al. | 375/96 |
| 4,238,648 | 12/1980 | Epworth | 179/16 F |
| 4,243,956 | 1/1981 | Lemoussu et al. | 375/12 |
| 4,298,983 | 11/1981 | Kawai et al. | 375/12 |
| 4,333,063 | 6/1982 | Ryu et al. | 333/28 R |

Primary Examiner—Benedict V. Safourek
Assistant Examiner—Stephen Chin
Attorney, Agent, or Firm—John T. O'Halloran; Thomas F. Meagher

[57] ABSTRACT

A repeater for PCM or digital transmission systems includes, in addition to the usual primary feedback control loop, a secondary feedback control loop having a low-pass filter and a peak detector to derive a control signal for a controllable impedance in the equalizer circuit. This control loop optimizes the repeater performance for different cable types and characteristics with regard to the low frequency energy content of the eye diagram.

3 Claims, 2 Drawing Figures

REPEATER FOR A DIGITAL TRANSMISSION SYSTEM

CROSS-REFERENCE TO RELATED APPLICATION

The present application is a continuation-in-part application of prior application Ser. No. 219,556, filed Dec. 23, 1980, now abandoned.

BACKGROUND OF THE INVENTION

This invention relates to repeaters for PCM (pulse code modulation) or digital transmission systems, and more particularly to arrangements for compensating therein for transmission line characteristics.

Conventional automatic line build out (ALBO) networks provide variable equalization within a primary equalization feedback control loop to correct mainly for frequency dependent losses due to line length variations. However, changes in cable type, e.g., paper insulated, plastics insulated, etc., in cable characteristics and signal level variations all effect the performance of repeaters. The use of high efficiency line codes, such as that known as 4B3T and disclosed in U.S. Pat. No. 3,611,141, issued Oct. 5, 1971, requires accurate equalization of line losses, especially at lower frequencies where this code contains more energy than codes, such as that known as HDB3 (High Density Bipolar 3), whether or not the signals are scrambled.

A known equalizer circuit for heavily multiplexed PCM systems, e.g., 48 channels at 2.37 M bit/sec, for example, is shown in FIG. 1. This circuit incorporates an equalizer 13 including a shaping network SN, inductor L1 and a variable resistor R1; and a primary equalization control loop to keep the height of the so-called "eye diagram" or "eye pattern" constant, with the ALBO network 12 including shaping network SN1 and controllable impedance, such as the diode network 11, carefully designed to give correct equalization for a range of different line lengths. The equalized signal is taken from a decision point X and applied to an ALBO peak detector 10, which is a conventional known peak detector to detect the peak voltage or "height" of the eye diagram. This peak value is amplified and fed to a controllable impedance in the form of diode network 11, a controllable resistance. The output of diode network 11 is used to control the ALBO network equalization. When the repeaters are manufactured a manually adjustable variable resistor is included in shaping network SN1 to enable the repeater, once installed, to be adjusted for the low frequency content of the eye diagram.

SUMMARY OF THE INVENTION

An object of the present invention is to provide an improved arrangement in a repeater for a PCM or digital transmission system to compensate for transmission line characteristics.

A feature of the present invention is the provision of a repeater for a digital transmission line system comprising an automatic line build out circuit having a primary equalization feedback control loop therefor; and an equalizer circuit coupled to the input of the line build out circuit having at least one secondary feedback control loop coupled to the output of the line build out circuit, the secondary loop including a filter coupled to the output of the line build out circuit and a first peak detector coupled to the output of the filter to produce a control signal to control a controllable impedance means of the equalizer circuit.

In a preferred embodiment, the secondary loop filter is a low pass filter.

Another feature of the present invention is the provision of a method of equalization for a digital transmission line repeater comprising the steps of filtering digital signals; detecting peak values of the filtered digital signals, and deriving from the detected peak values a control signal for controlling equalization in the repeater.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENT

Figure 1:
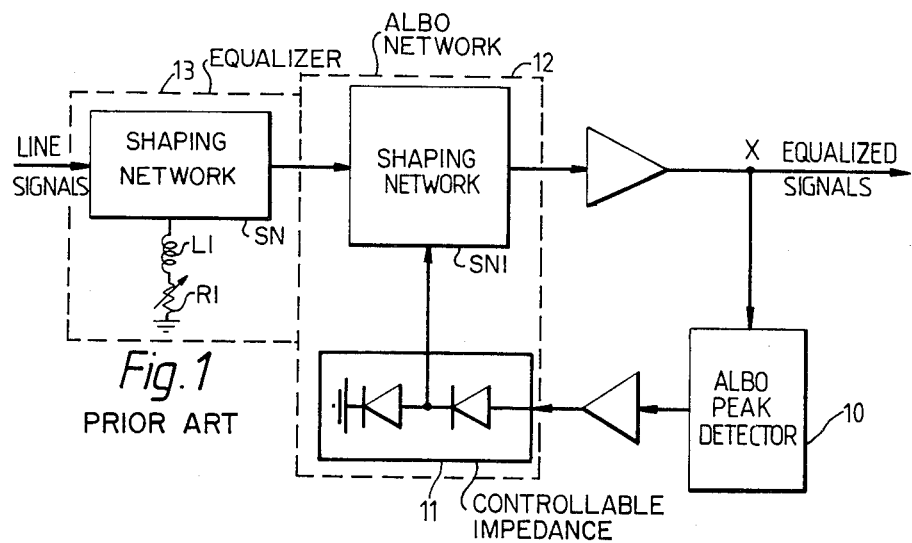
FIG. 1 is a block diagram of the prior art equalization arrangement described hereinabove under the heading "Background of the Invention"
Figure 2:
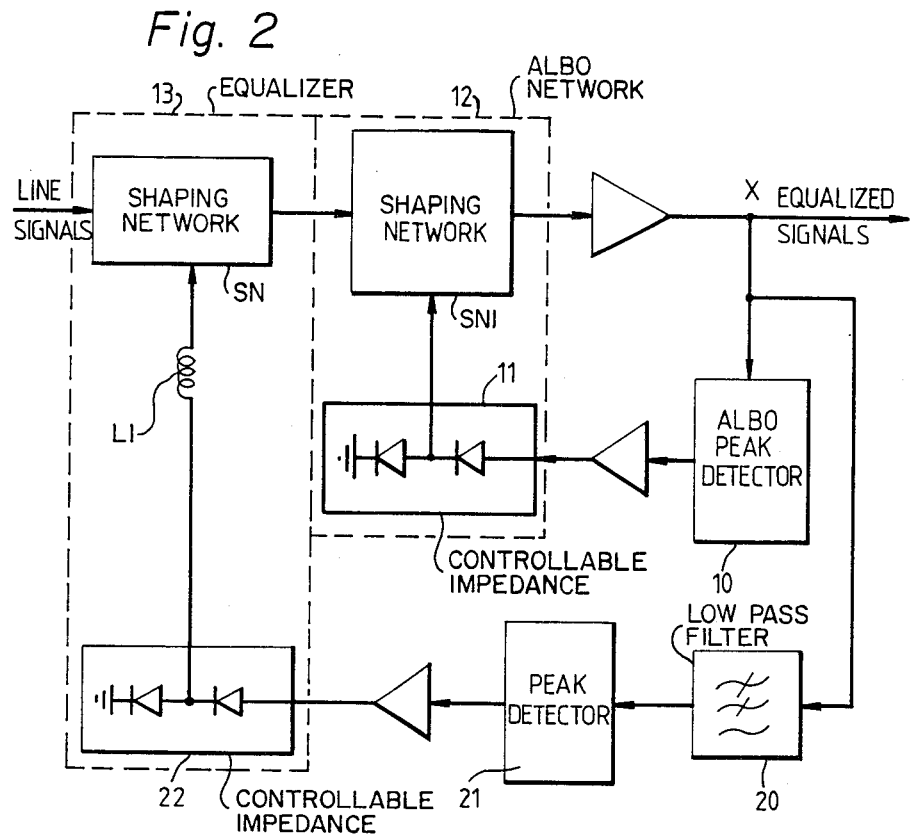
FIG. 2 is a block diagram of a repeater equalization arrangement in accordance with the principles of the present invention.

The repeater of FIG. 2 is basically the repeater of FIG. 1 with the addition of the secondary control loop. The equalized signals from decision point X are fed to a lowpass filter 20 which is followed by a peak detector 21 to detect the peak voltage at the output of filter 20. The output of peak detector 21 is amplified and fed as a control signal to a variable impedance 22 in equalizer 13 in the form of a diode network, which provides a variable resistance. The low pass filter 20 ensures that the secondary loop only responds to the low frequency content of the eye diagram for control of equalizer 13. The shunt inductor L1 to ground in equalizer 13 plays a major part in determining the shape of the repeater low frequency loss. Variation of the controllable impedance 22 will alter the limiting value of this low frequency loss, thus, allowing the repeater to compensate for changes in cable low frequency loss. Since the secondary control loop senses the peak amplitude of the equalized signal low frequency voltage it automatically adjusts the equalizer to give a constant amplitude of low frequency voltage in the equalized signal at point X. This automatic control of equalizer 13 optimizes the equalization for the best eye diagram, regardless of the cable type or characteristic of the input cable.

While we have described above the principles of our invention in connection with specific apparatus, it is to be clearly understood that this description is made only by way of example and not as a limitation to the scope of our invention as set forth in the objects thereof and in the accompanying claims.

We claim:

1. A repeater for a digital transmission line system comprising:
   an automatic line build out circuit having a primary equalization of feedback control loop coupled between an output of said line build out circuit and a first controllable impedance means connected in said line build out circuit; and
   an equalizer circuit having its output coupled to an input of said line build out circuit, said equalizer circuit having at least one secondary feedback control loop coupled to said output of said line build out circuit, said secondary loop including a filter coupled to said output of said line build out circuit and a first peak detector coupled to the output of said filter for sensing the peak amplitude of the equalized signal low frequency voltage developed at said filter output to produce a control signal to control a variable resistance means connected in said equalizer circuit.

2. A repeater according to claim 1, wherein said filter is a low pass filter.

3. A repeater according to claim 1 or 2, wherein said primary loop includes a second peak detector having its input coupled to said output of said line build out circuit and its output coupled to said first controllable impedance means to control said line build out circuit.

* * * * *